United States Patent
Lipper

(10) Patent No.: US 8,151,846 B2
(45) Date of Patent: Apr. 10, 2012

(54) WHEEL HAVING INNER BEAD-LOCK

(75) Inventor: Ray W. Lipper, Santa Fe Springs, CA (US)

(73) Assignee: Center Line Wheel Corporation, Santa Fe Springs, CA (US)

( * ) Notice: Subject to any disclaimer, the term of this patent is extended or adjusted under 35 U.S.C. 154(b) by 104 days.

(21) Appl. No.: 12/634,471

(22) Filed: Dec. 9, 2009

(65) Prior Publication Data

US 2010/0147428 A1    Jun. 17, 2010

Related U.S. Application Data

(63) Continuation-in-part of application No. 11/639,496, filed on Dec. 15, 2006, now abandoned.

(51) Int. Cl.
*B60C 5/16* (2006.01)
*B60B 21/10* (2006.01)

(52) U.S. Cl. .................. 152/399; 152/379.5

(58) Field of Classification Search .... 152/379.3–379.5, 152/381.3–381.6, 387–392, 399–402, 409–410
See application file for complete search history.

(56) References Cited

U.S. PATENT DOCUMENTS

| | | | |
|---|---|---|---|
| 2,438,966 A | 4/1948 | Eskergian et al. |
| 2,968,332 A | 1/1961 | Gonzalez |
| 3,025,898 A | 3/1962 | Opel |
| 3,028,900 A | 4/1962 | Scott |
| 3,826,538 A | 7/1974 | Lipper |
| 4,102,379 A | 7/1978 | Kamiya |
| 4,163,466 A | 8/1979 | Watts |
| 4,223,952 A | 9/1980 | Weld |
| 4,253,514 A | 3/1981 | Imamura |
| 4,424,842 A | 1/1984 | Trebaol |
| 4,466,670 A | 8/1984 | Kaji |
| 4,528,146 A | 7/1985 | Bockmann et al. |
| 4,640,330 A | 2/1987 | Frassica |
| 4,679,860 A | 7/1987 | Koishi et al. |
| 4,770,220 A | 9/1988 | Mori |
| 4,936,129 A | 6/1990 | Lipper et al. |
| 4,989,657 A | 2/1991 | Lipper |
| D318,449 S | 7/1991 | Lipper |
| 5,104,197 A | 4/1992 | Lipper |
| D327,466 S | 6/1992 | Lipper |
| 5,435,629 A | 7/1995 | Suzuki |
| 5,634,271 A | 6/1997 | Lipper |
| 6,763,865 B1 | 7/2004 | Bernoni |
| 7,347,241 B2 | 3/2008 | Gardetto |
| 7,398,809 B2 | 7/2008 | Steinke et al. |
| 2006/0289099 A1 | 12/2006 | Steinke et al. |

(Continued)

OTHER PUBLICATIONS

The Tire and Rim Association, Inc.; "Tire and Rim Association Standard Contour Symbols and Nomenclature"; 2005; pp. 8-04-8-05.

(Continued)

*Primary Examiner* — Jason Bellinger
(74) *Attorney, Agent, or Firm* — Christie, Parker & Hale, LLP

(57) ABSTRACT

The present invention provides a vehicle wheel system having an inner wheel half, an outer wheel half, a centering element, and a sleeve which are concentrically aligned with each other, where the centering element has a first bead lock for securing a first bead of a tire and where the sleeve has a second bead lock for securing a second bead of the tire, to enable a vehicle to continue to operate with a flat or deflated tire. For a heavier, military vehicle wheel system, a varied centering element is used in conjunction with segmented inner tire system.

17 Claims, 12 Drawing Sheets

U.S. PATENT DOCUMENTS

2010/0147428 A1     6/2010    Lipper
2010/0225156 A1     9/2010    Lipper

OTHER PUBLICATIONS

Hutchinson Worldwide; "User Manual, Assembly/Disassembly Instructions; Hutchinson AS-0311 Wheel, Tire, and VFI Runflat Application: 2004 Chevy Suburban"; Hutchinson Industries Defense & Security Department; Trenton, NJ; Rev. Jan. 2006; 26pp.

AM General Corporation; "2001 Hummer Parts Catalog"; Wheels and Tires/Central Tire Inflation System; Section 6; 70pp.

Dusty Times; Beadlock Advertisement, p. 29, Robby Gordon Off Road Advertisement, p. 32, Oct. 2009, vol. 26, No. 10.

Nylund, Jimmy, "A Bright New DOT-Approved Forged Bead-Lock Design", Four Wheeler, Feb. 2007, pp. 68-69.

Perronne, Craig, "Product Spotlight: Centerline Run Flat Wheel", DIRTsports Magazine, Jun. 2006, pp. 96-98.

SAE International, "Surface Vehicle Recommended Practice", Wheels/Rims-Military Vehicles-Test Procedures and Performance Requirements, Warrendale, PA, Rev. Mar. 2001, 10 pp.

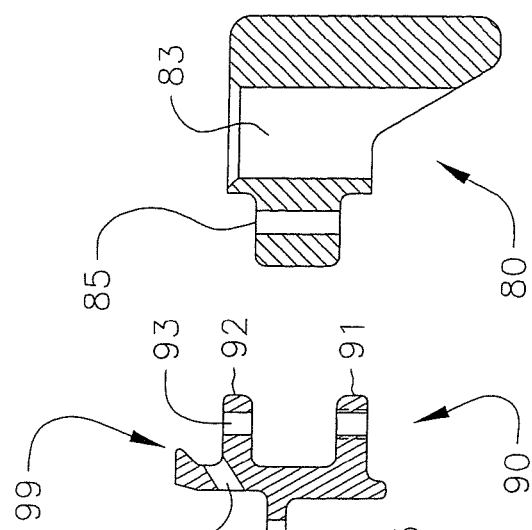
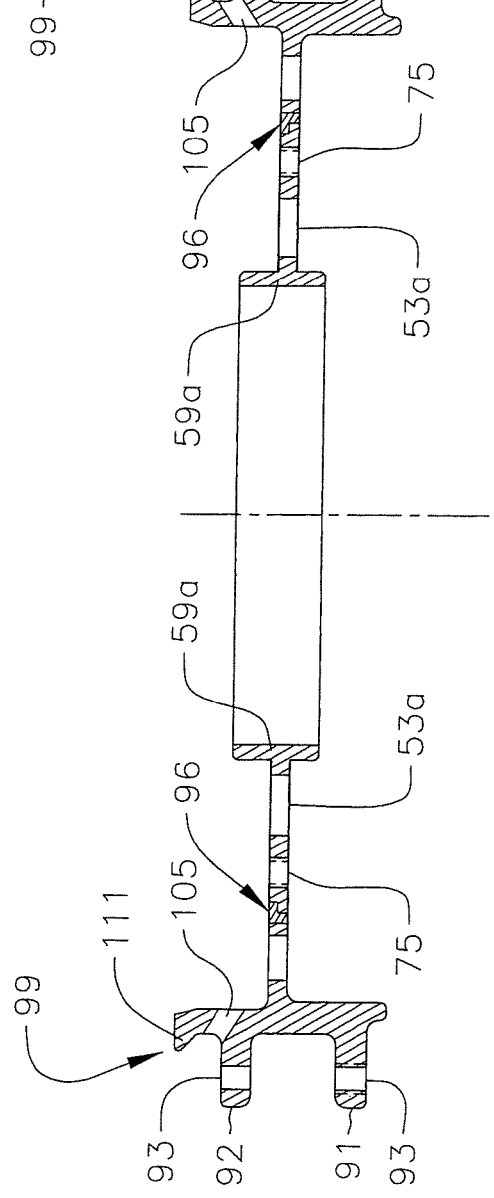

FIG.7A
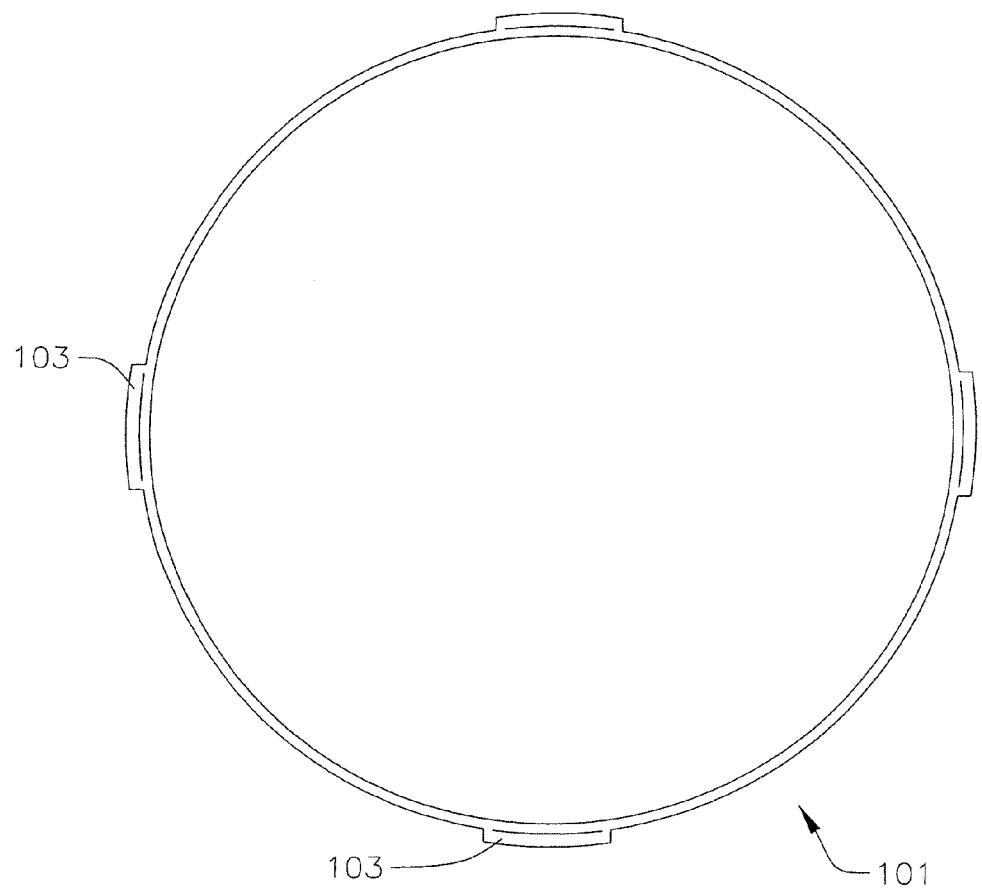
FIG.7B
FIG.7C
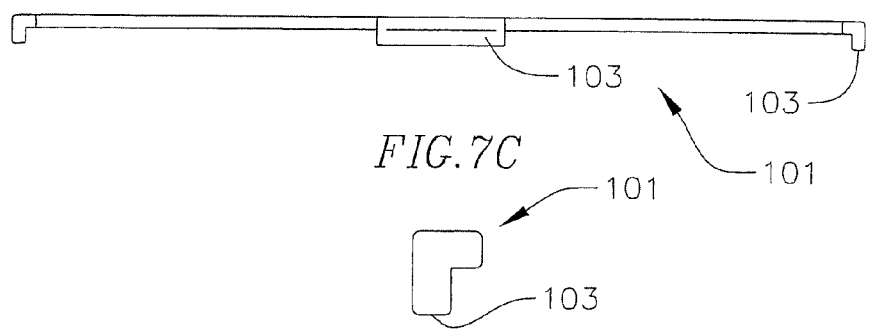

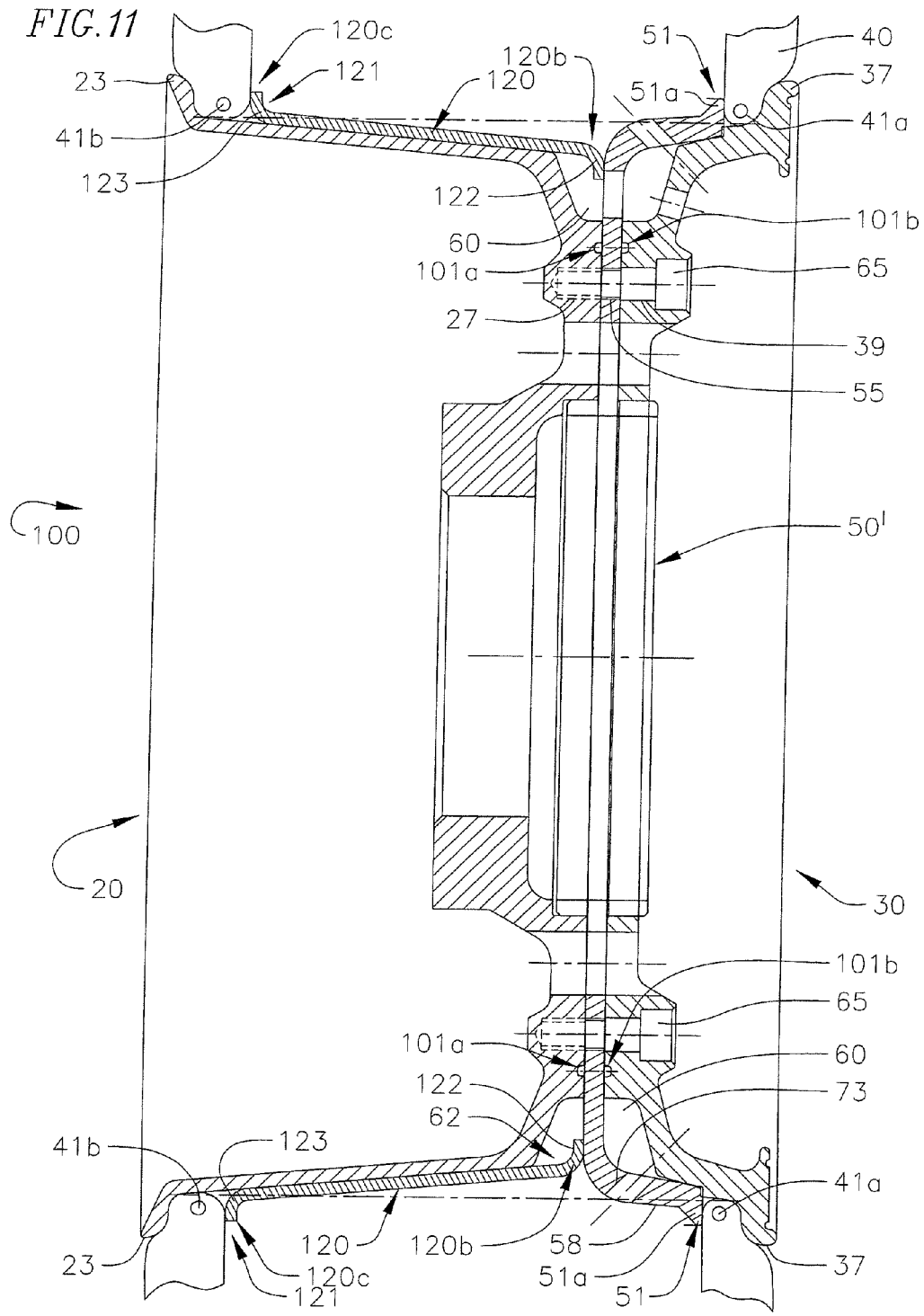

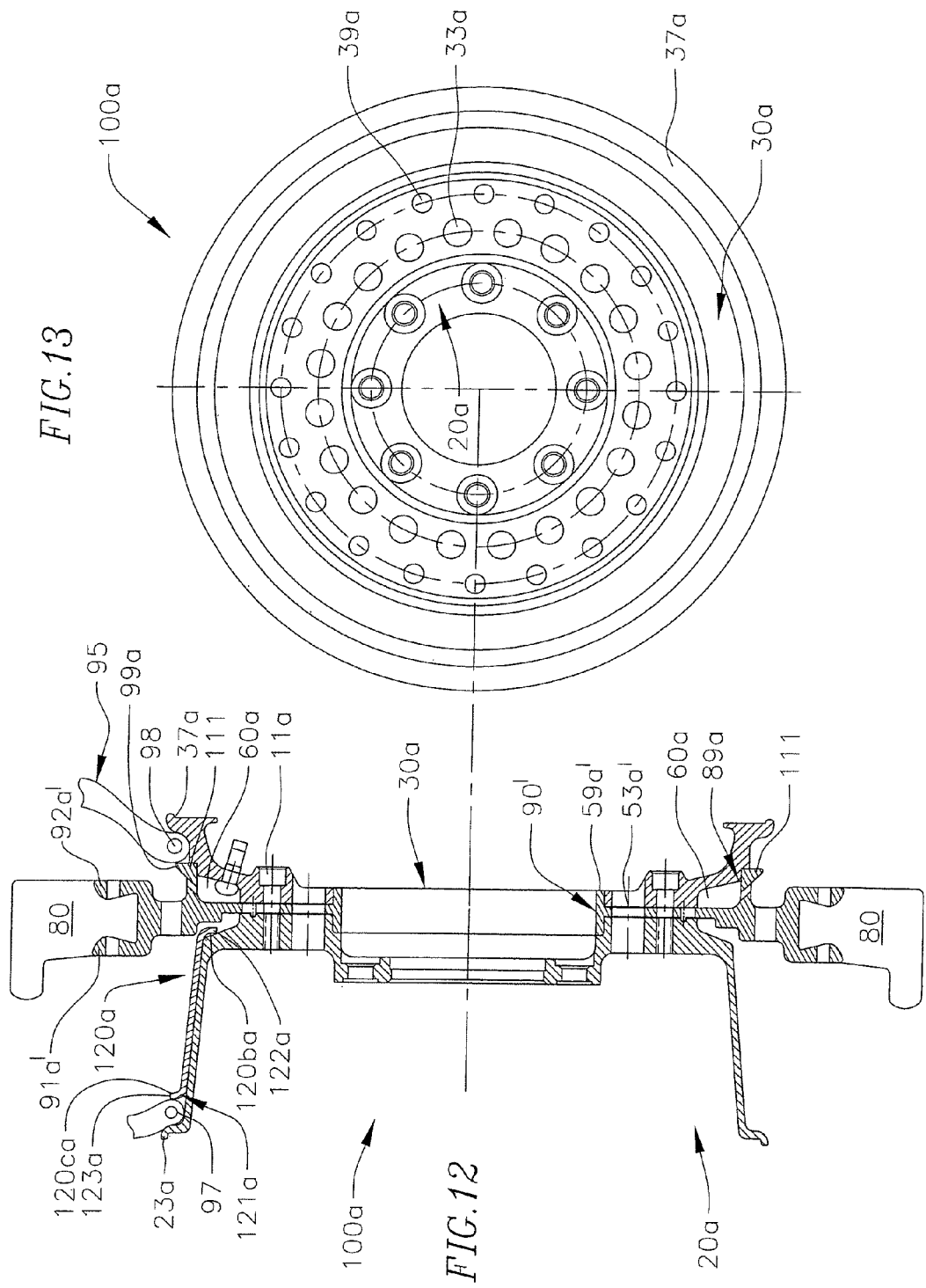

WHEEL HAVING INNER BEAD-LOCK

RELATED APPLICATION INFORMATION

This application is a continuation-in-part of and claims priority to U.S. patent application Ser. No. 11/639,496, filed on Dec. 15, 2006, now abandoned the entire contents of which are incorporated herein.

BACKGROUND OF THE INVENTION

1. Field of the Invention

The present invention relates to vehicle wheels, and more particularly to run flat tires which can be used to operate a vehicle when there is a flat or deflated tire.

2. General Background and State of the Art

Lightweight Application—Light Trucks and S.U.V.'s

There are two main problems that exist in this art. One is that the weight of a single combined tire and wheel for the vehicles at issue here can exceed 100 pounds. Therefore, it can be very difficult if not impossible for an individual to dismount a flat tire and wheel from a vehicle and remount a spare tire, especially in adverse conditions in the field. It is therefore advantageous for a vehicle to be able to run on a deflated tire at least for a certain distance to deliver a passenger to a safe place to repair or replace the tire or change the vehicle.

The second problem also relates to safety. A tire may blow out due to a sudden impact or a faulty tire. Regardless of how a tire fails, however, the failure can cause the deflated tire to traverse freely or uncontrollably within the wheel rim, becoming twisted and unstable, which can cause the vehicle to roll over at normal speeds.

Conventional pneumatic tire and wheel combinations for automobiles and light trucks are based on a configuration of the rim that includes an outer rim (facing outward from the vehicle), an inner rim (facing inward), and a tire mounting well or drop smaller in diameter than the outer edges of the inner and outer rims. The mounting well lies in close proximity to one of the rim edges to facilitate easy mounting of the tire. For example, the mounting well may be near the inner rim of the wheel. The inner tire bead is placed into this mounting well, and then the outer tire bead is mounted within the outer rim. Then the inner tire bead is moved into position against the inner rim, and the tire is inflated. Mounting the tire in this way typically requires the assistance of special tools or equipment to allow the balance of the tire to be mounted within the wheel and rim section.

Aside from mounting the tire to the wheel, the mounting well has no other practical use. However, in the event of a tire failure such as a flat tire or a blow out, the deflated tire drops back into the mounting well. The deflated tire twists on itself and gathers in folds into the tire mounting well, so that the tire is no longer in smooth contact with the ground. The wheel cannot continue to roll over a tire that is twisted in this way. As a result, the vehicle is no longer operative.

Prior solutions to the above problems are now described. Run-flat tires have been manufactured by parties such as The Goodyear Tire & Rubber Co., which introduced an asymmetrical design to lock the tire bead in place relative to the wheel. This was done in approximately 1983. Further, one solution was a wheel having a solid inner wheel located within the tire. In approximately 1997, a manufacturer introduced another wheel under the acronym "PAV," which translates as "Vertical Anchorage Tire." The acronym PAV was changed to PAX in approximately 1998. The key elements of the PAX system are special wheels with unique tire bead locks and a solid insert that can fully support its shape under the vehicle's weight and permit the vehicle to continue rolling even without any tire pressure.

In 2002, Bridgestone Corporation and Continental Tire developed a different run flat tire. It was later abandoned since the equipment to mount and dismount the tires was specialized. It should be noted that in each of the above developments, the concentration was on passenger or sports car type vehicles having tires with a low aspect ratio (sidewall height divided by tread width).

All of the above concepts have been the subjects of considerable research and development by major tire manufacturers, which suggest that the issue is important, but to date these efforts have not met with great success. Additionally, there is little developed run-flat technology for larger tires (light trucks and S.U.V.'s) that possess different geometry and load ratings than passenger car tires.

In terms of bead-lock wheel technology, conventional automotive tires and rims are similar in the contour of the bead, thereby providing an airtight combination between the wheel and the tire. The most popular bead-lock wheel/rim concept for a run flat tire requires that the rim be altered on the outboard portion to provide a coaxial ring with a series of threaded holes near the inner circumference. This ring is generally welded to the altered rim. In such a case, the tire can be mounted to the wheel by hand or with mounting equipment. However, the outboard portion of the tire must be positioned to lie on top of the attached ring and aligned outside the threaded holes. A separate ring can then be fastened into position with bolts, clamping and compressing the tire beads to a non-leaking state, after which the tire is inflated. Wheels of this type seal in a manner contrary to the tire's original design and concept, and may be used for short durations, such as for racing, prior to chronic air leaking. However, they are not satisfactory for use with light trucks and S.U.V.'s.

The present invention is an improvement on existing bead-lock technology. It also relates to the technology of, and improves upon, a prior modular vehicle wheel as shown in U.S. Pat. No. 4,989,657 by the same inventor, issued on Feb. 5, 1991, entitled "Modular Vehicle Wheel." In that patent, a two-piece modular automotive wheel includes a rear section having a relatively thick center portion and a thinner rim portion. The rear section is produced by a spin forging process to achieve the desired thickness at various locations. A registration surface is machined in the center portion. A front rim section is secured to the rear section at the registration surface. A locking ring, which may also be spun forged, may be secured to the front rim section to lock the bead of the tire. The content of U.S. Pat. No. 4,989,657 is hereby incorporated by reference.

Military Tactical Vehicle Run Flat Wheels

Another area of improvement in run flat wheels that the present invention addresses is military tactical vehicle wheels and the like. Conventionally, these wheels include a solid rubber interior tire inside the inflated tire. The vehicle can run on this solid interior tire for a limited distance if the inflated, exterior tire becomes flat. There are two main problems with such wheels. One is that mounting and dismounting and/or inserting and removing a deflated tire from such wheels requires a high level of skill, specialized equipment and an inordinate amount of time. This is principally due to the physical size of the existing solid rubber inner (run flat) tire ring which is 30% larger in diameter than the diameter of the hole in which it must fit (the hole in the center of the inflatable tire).

Specifically, the solid rubber inner run flat tire ring measures 661.37 mm or 26.0 inches in diameter with a 4.0 inch thick cross section. The opening in the center of the inflatable tire is about 17.0 inches in diameter. From a strictly geometrical and physical stand point, it is extremely difficult to insert a 26.0 inch diameter object into a 17.0 inch diameter hole, and it is equally difficult to remove the object intact. However, given sufficient time, effort, and specialized equipment, it is possible to perform the task. One method is to compress the existing solid rubber interior tire ring under several tons of static pressure to a contour befitting a 17.0-inch diameter hole. However, the fact that the task requires specialized equipment and skills contributes to the difficulty presented by a flat or deflated tire.

The second problem is related to time, i.e., the time required to change a deflated, run flat tire of the existing solid rubber ring type. Currently, the required time to disassemble and re-assemble a deflated or disabled tire is about five hours using existing methods.

It is therefore desirable to provide an improved wheel system that permits safer operation of a vehicle for a longer duration for light trucks and S.U.V.'s on one hand, and military vehicles on the other hand, in the event of a flat or blown out tire.

It is also desirable to provide a wheel system which, in the event of a flat or blow out, prevents contortion of the tire in the wheel well.

It is further desirable to provide a wheel system that can be mounted and dismounted without specialized equipment and with less time than prior systems.

It is also desirable to provide a wheel system which employs a bead lock system and a centering element.

These and other advantages may be achieved by the present invention, as will become readily apparent from the detailed description taken in conjunction with the accompanying drawings.

SUMMARY OF THE INVENTION

The present invention relates to vehicle wheels, and more particularly to run flat tires that can be used to operate a vehicle even when the tire is flat or deflated. In one embodiment, the wheel configuration according to the present invention enables a driver or operator to maintain control of a light truck or an S.U.V. with a low or deflated tire at low speeds while minimizing the possibility of a rollover. The present invention provides a system that retains or locks the tire bead against the rim with one or more bead locks to prevent any relative tire movement that can cause abrupt changes in vehicle direction.

Specifically, in one embodiment, the wheel system employs three main parts, an outer wheel half, an inner wheel half and a centering element. The centering element is provided with a centering element rim, an outer bead lock, and a collar for centering and aligning the two wheel halves. The outer bead lock is provided to fix a tire between the bead lock and the outer rim of the tire. Another embodiment of the present invention employs a segmented interior tire system in addition to a variation of the centering element above.

In another embodiment, the present invention provides a system which retains or locks both the outer tire bead and the inner tire bead against the rims of the wheel with an outer bead lock and an inner bead lock, respectively. Specifically, in this embodiment, the wheel system employs four main parts: an outer wheel half, an inner wheel half, a sleeve, and a centering element. The centering element is provided with a centering element rim, an outer bead lock, and a collar for centering and aligning the two wheel halves. The sleeve is provided with an inner bead lock. The outer and inner bead locks fix the outer and inner beads of the tire, respectively. Another embodiment of the present invention employs a segmented interior tire system in addition to a variation of the centering element above.

In another embodiment, there is provided a wheel system having an inner wheel half and an outer wheel half for use with a tire. The wheel system includes a centering element located between the inner wheel half and the outer wheel half, the centering element having a first bead lock configured to lock a first bead of the tire, and a sleeve located between the inner wheel half and the outer wheel half, the sleeve having a second bead lock configured to lock a second bead of the tire.

In another embodiment, a wheel assembly for a tire includes an inner wheel section having a rim, an outer wheel section having a rim, and a centering element positioned between the inner wheel section and the outer wheel section. The wheel assembly also includes an inner bead lock for locking a tire between the inner bead lock and the rim of the inner wheel section. The wheel assembly also includes an outer bead lock for locking a tire between the outer bead lock and the rim of the outer wheel section.

In another embodiment, a run-flat wheel assembly for a tire includes an inner rim, an outer rim, a center segment clamped between the inner rim and the outer rim, an inner stop for clamping an inner bead of the tire between the inner stop and the inner rim, and an outer stop for clamping an outer bead of the tire between the outer stop and the outer rim.

BRIEF DESCRIPTION OF THE DRAWINGS

The invention will now be described with reference to the accompanying drawings.

FIG. 5a is a cross-sectional view of a centering element of the wheel of FIG. 4;

FIG. 5b is a cross-sectional view of an interior tire section of the wheel of FIG. 4;

FIG. 7a is a plan view of a modified O-ring in accordance with one embodiment of the invention;

FIG. 7b is a side view of the modified O-ring of FIG. 7a;

FIG. 7c is a cross-sectional view of the modified O-ring of FIG. 7a;

FIG. 11 is a cross-sectional view of an assembled wheel according to another embodiment of the invention which includes a sleeve having an inner bead lock;

FIG. 12 is a cross-sectional view of an assembled run-flat wheel for military use according to a further embodiment of the invention which includes an interior tire and a sleeve having an inner bead lock;

FIG. 13 is a front view of the wheel of FIG. 12; and

DETAILED DESCRIPTION OF THE PREFERRED EMBODIMENTS

Lightweight Application—Light Trucks and S.U.V.'s

The following description is of the best presently contemplated mode of carrying out the invention. This description is made for the purpose of illustrating the general principles of the invention and is not to be taken in a limited sense. The scope of the invention is best determined by reference to the appended claims.

Figure 1:
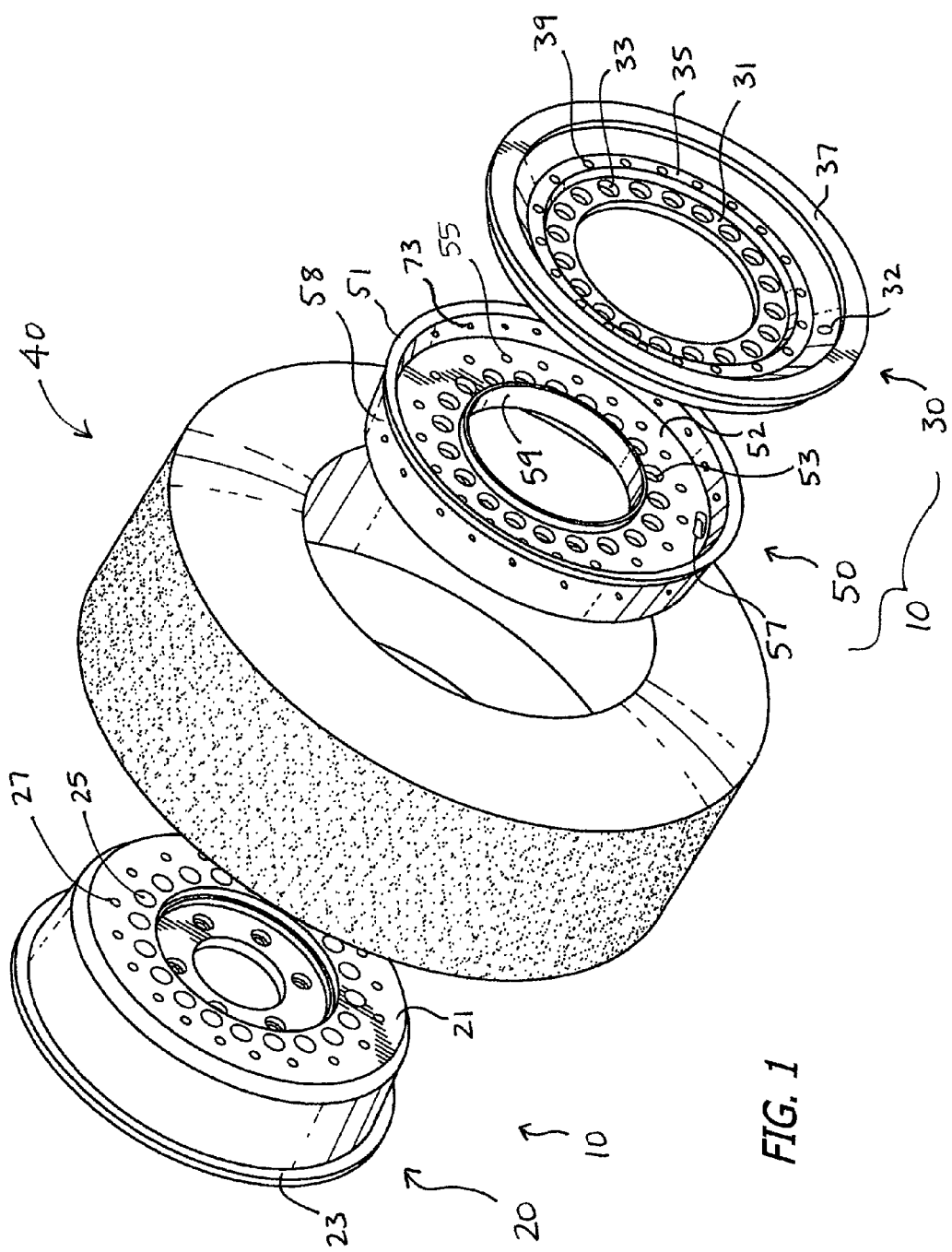
FIG. 1 is an exploded view of a wheel according to one embodiment of the present invention with a tire.

Referring now to the drawings, there is shown in FIG. 1 an exploded view of a wheel generally designated 10, constructed in accordance with the teachings of the present invention. Wheel 10 has three main portions. The outer two portions are cup-shaped wheel halves 20 and 30. The inner wheel half 20 is employed on the inner side of a tire 40, and the outer wheel half 30 is employed on the outer side thereof (as evidenced in part by the air sensor slot 32 in outer wheel half 30 in FIG. 1). A third element of the wheel is a centering element 50, which fits between the two halves 20, 30.

Figure 2:
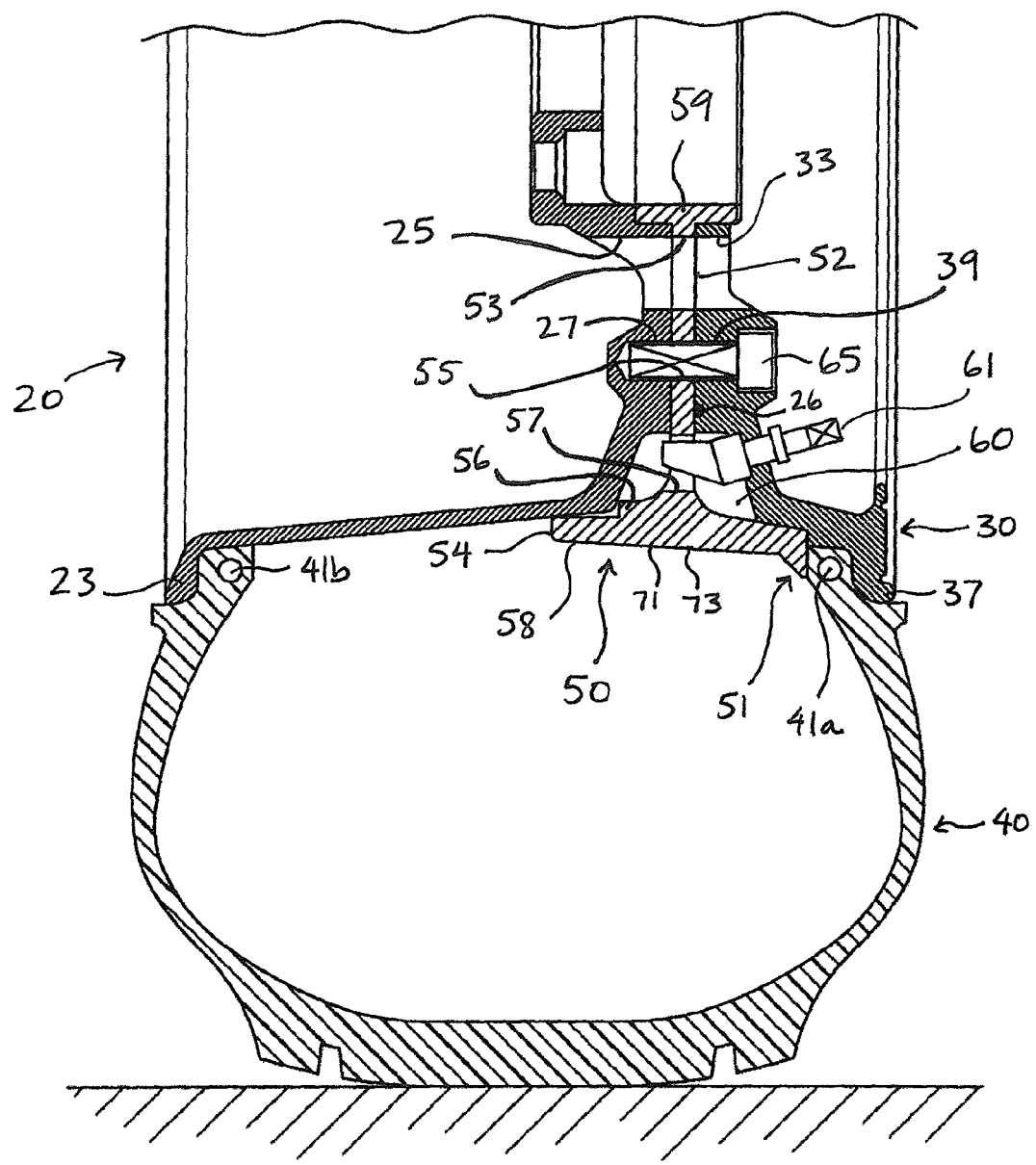
FIG. 2 is a cross-sectional view of the wheel of FIG. 1 with an inflated tire.

FIG. 2 shows a partial cross-sectional view of the assembled wheel 10 with a tire 40 mounted and inflated. The inner and outer wheel halves 20 and 30 are shown sandwiching the centering element 50 therebetween.

Referring again to FIG. 1, the wheel halves 20 and 30 have center sections 21 and 31, respectively, and integral rim sections 23 and 37, respectively. Thus, each of the wheel halves 20 and 30 is made in one piece, preferably from a material such as aluminum. Furthermore, because of the cup-shaped appearance, each of the wheel halves 20 and 30 may be forged in accordance with known manufacturing procedures.

The inner wheel half 20 has the rim section 23 and the center portion 21. The center portion 21 includes a circular row of multiple lightening holes 25. These lightening holes 25 reduce the amount of material carried by the wheel 10 and serve to lighten the weight of the wheel. Another circular row of bolt holes 27 is provided at a point radially outwardly from the row of lightening holes 25 to accommodate bolts 65 (FIG. 2) to hold the inner wheel half 20, the centering element 50 and the outer wheel half 30 together. The rows of bolt holes 27 and lightening holes 25 are provided concentrically.

Similarly, the outer wheel half 30 has the rim section 37 and the center portion 31. In the center portion 31, a circular row of multiple lightening holes 33 are defined to lighten the weight of the wheel. Radially outside of these lightening holes 33 is a circular row of bolt holes 39, which accommodate the above-mentioned bolts 65 (FIG. 2). In addition, an air sensor slot 32 is provided between an intermediate portion 35 and the integral rim section 37 of the outer wheel half 30. This air sensor slot 32 is provided to accommodate an air sensor 61 shown in FIG. 2, which extends outwardly toward the exterior side of the tire for access by an individual.

Figure 3:
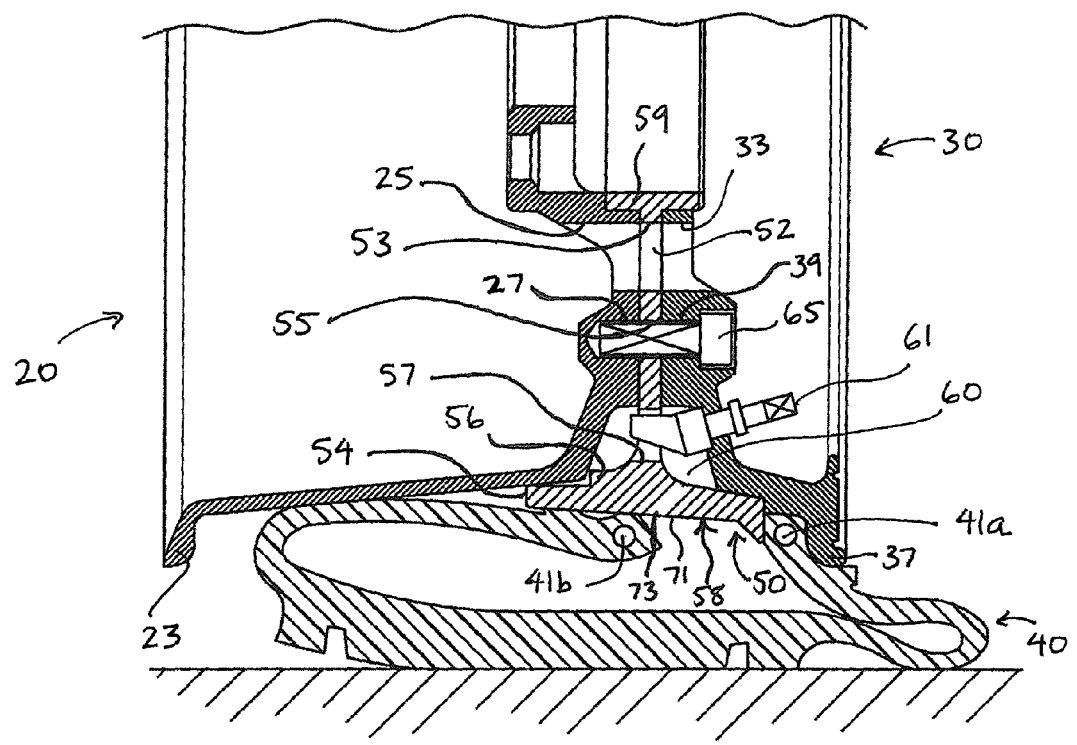
FIG. 3 shows a cross-sectional view of the wheel of FIG. 1 with a deflated tire.

The centering element 50 as seen in FIGS. 1-3 has a collar 59 in the center thereof. The collar 59 centers the different portions of the wheel 10, namely the inner and outer wheel halves 20 and 30. As shown in FIG. 2, the collar 59 abuts both the inner wheel half 20 and the outer wheel half 30 to rigidly position and stabilize them. The centering element 50 also has a disc portion 52 and a centering element rim 58. The disc portion 52 connects the collar 59 (toward the radial center of the element 50) and the rim 58 (toward the radial outer edge of the element 50).

The disc portion 52 of the centering element 50 has an outer surface facing the outer wheel half 30 and an inner surface facing the inner wheel half 20. The disc portion 52 is sandwiched between the two halves 20, 30, with the inner half 20 contacting the inner surface of the disc portion 52 and the outer half 30 contacting the outer surface of the disc portion 52. The three components 20, 30, 50 are clamped tightly together at this disc portion 52 by the bolt or fastener 65. Thus, the disc portion 52 provides a solid connection between both halves 20, 30 and enables them to be tightly clamped to the centering portion 50 and to each other with a bolt 65. Additionally, the disc portion 52 positions the bolt 65 away from the interior of the tire 40, so that the bolt is not exposed inside the tire. One or more O-rings can be provided in one or more grooves or slots that are located radially between the bolt 65 and the tire 40 to seal the connection between the halves 20, 30, for example, O-ring 26 in FIG. 2. This design prevents pressurized air inside the tire 40 from escaping through the bolt holes 27, 39.

The centering element rim 58 has an inner end 54 (toward the inner side of the wheel, facing inner wheel half 20) and an outer end (toward the outer side of the wheel, facing outer wheel half 30) and a rim surface 71 extending between the two ends. The centering element rim 58 is substantially flat at end 54, on the inner side of the wheel. Opposite end 54, at the outer side of the wheel, the rim 58 has an outer bead lock 51. The outer bead lock 51 is a part of the centering element 50 and forms a ridge or rim which protrudes radially outwardly from the centering element rim surface 71. The outer bead lock 51 clamps an outer end of a tire 40 between the bead lock 51 and rim 37 of the outer wheel half 30. Steel cables (or tire beads) 41a and 41b are provided in the tire 40 as shown (cross sections shown in FIG. 2). The outer tire bead 41a is clamped between the bead lock 51 and the rim 37.

The outer bead lock 51 provides a positive locking feature on the interior of the tire 40. In the embodiment shown in FIG. 2, the centering element 50 (the rim 58 and outer bead lock 51) extends the wheel into the interior portion of the tire 40. Thus, in this embodiment, a wheel such as the modular vehicle wheel of the U.S. Pat. No. 4,989,657 which was mentioned above, is extended to the interior reaches of the tire. Additionally, the wheel does not use a separate, add-on tire locking ring (as shown in U.S. Pat. No. 4,989,657). The bead lock 51 can permanently lock the outer tire bead 41a in place against the wheel, from the interior of the tire. Further, the centering element 50 becomes a stationary, fixed part of the modular wheel that is not introduced to conventional wheels or rims as an exterior, add-on feature.

Another feature of the centering element 50 is the centering element rim 58, which acts as a shelf extending over the tire mounting well 60. As described above, a deflated tire can move into this mounting well 60, becoming folded and twisted so that the vehicle can no longer continue to drive on the deflated tire. As shown in FIG. 3, when the tire 40 becomes deflated, the inner tire bead 41b is no longer held in place against the inner rim 23. The tire 40 folds on itself and the inner tire bead 41b moves along the inner half 20 toward the outer side of the wheel and toward the mounting well 60. The centering element rim 58 supports the inner tire bead 41b and allows it to move to a stable location without becoming twisted or folded in the well 60. The rim 58 keeps the deflated tire 40 stable and in smooth contact with the road. The rim 58 extends over the mounting well 60 and supports the deflated tire 40 away from the well. Thus, the rim 58 prevents the inner tire bead 41b from twisting, folding, and moving into the well 60 and thereby disrupting the contact of the deflated tire on the road, which can cause the vehicle to overturn.

Referring again to FIG. 2, the centering element rim surface 71 is tilted at an angle of approximately 4 degrees, tilting toward the ground at the outer side of the wheel. However, this angle may be varied in other embodiments, depending on the particular geometry and size of the wheel and tire, as long as the centering element 50 still functions as intended, to center the wheel halves, to provide the outer bead lock 51, and/or to support the deflated tire away from the mounting well 60, as described above. Another feature shown in FIG. 2 is a step 56, which is located on the centering element 50 on the inner side of the wheel, and on the radially inward side of the rim 58 (opposite the surface 71). The step 56 serves to fix the centering element 50 with respect to the tire mounting well 60 by wedging the centering element rim 58 against a shoulder of the interior wheel half 20. The step 56 aligns and secures the centering element 50 with respect to the inner wheel half 20 and the mounting well 60.

The centering element rim 58 also includes a series of air intake holes 73 which are equally spaced and drilled on the outer circumference of the rim (see FIGS. 1-2). In this embodiment, twenty air intake holes 73 are provided. These apertures provide passages for air to inflate the tire.

In one embodiment, the three modular sections 20, 30, 50 of the wheel are forged aluminum (series 6061), heat-treated and aged to its highest tensile strength. In another embodiment, the sections may be cast aluminum or steel; however, forged aluminum material may be preferred due to its strength characteristics and low weight. However, the present invention should not be considered as being limited to embodiments in which the wheels are made of forged aluminum and can be composed of any material suitable for wheels, including cast aluminum and steel.

In one embodiment, the manufacturing process for all three components 20, 30, 50 of the wheel is similar. First, the aluminum material is cut from 8-inch or 9-inch diameter, 20-foot length into cylinder lengths with a predetermined volume. The cylinder is then heated to a temperature over 900° F. The heated cylinder is placed within a forge die that is designed and constructed to manufacture this forged component of the wheel to a predetermined shape. A 4000-ton forge press then compresses the aluminum cylinder in the forge die, converting its material properties and shape. Subsequently, additional machines such as punch presses and/or C.N.C. spinning equipment further convert each component. The components are then heat treated and aged to a predetermined hardness. Then, the components are staged for a finishing machine process. Subsequent processes include cosmetic and assembly processes.

As mentioned above, the centering element 50 has a circular row of lightening holes 53, a circular row of bolt holes 55, and an air sensor slot 57 to accommodate an air sensor 61 for sensing the tire air pressure (see FIG. 1). The bolt holes 55 are positioned to coincide with the bolt holes 27 of the inner wheel half 20 and the bolt holes 39 of the outer wheel half 30. Similarly, a circular row of lightening holes 53 are provided to coincide with the lightening holes 25 and 33 of the inner wheel half 20 and the outer wheel half 30, respectively, when the three parts 20, 30 and 50 of the wheel 10 are assembled. These features coincide when the components are assembled as shown in FIG. 2, aligned by the centering element 50, including the collar 59, disc portion 52, and step 56.

The centering element 50 aligns the two wheels halves 20 and 30 without any shearing movement. Once the components 20, 30, and 50 are bolted together with a series of fasteners or bolts 65, the strength of these three components is such that the wheel 10 reacts and operates as a unitary, solid object. Specifically, the collar 59 of the centering element 50 abuts both the outer wheel half 30 and the inner wheel half 20, aligning these components and maintaining stability.

FIG. 3 shows the wheel 10 of FIG. 2 with the tire 40 in a deflated condition. In such a state, if the centering element 50 were not present, the deflated tire could become twisted into an "8" shape. Without the centering element 50 of the present invention, the twisted deflated tire could then end up in the tire mounting well 60. In such a condition, the deflated tire 40 does not remain in smooth, flat contact with the ground, between the ground and the wheel, and the automobile cannot be driven any further. In contrast, when the centering element 50 is included, the centering element 50 supports the deflated tire away from the tire mounting well 60 and enables the driver to continue driving on the deflated tire for a longer distance than would otherwise be possible.

FIG. 11 depicts another embodiment of the invention in which a wheel assembly 100 includes a fourth main portion: a sleeve 120 having an inner bead lock 121. The wheel 100 includes an inner wheel half 20, outer wheel half 30, centering element 50', and sleeve 120. The wheel 100 includes a bead lock at both the inner and outer beads of the tire. The inner bead lock 121 clamps the inner bead 41b of a tire 40 between itself and the rim section 23 of inner wheel half 20. Similarly, the outer bead lock 51 clamps the outer bead 41a of tire 40 between itself and the rim section 37 of outer wheel half 30. Therefore, in this embodiment, both the inner and outer tire beads are locked by the wheel. If the tire becomes deflated, the two bead locks 51, 121 prevent the deflated tire from moving along the wheel or from becoming twisted. As a result, the deflated tire remains in steady contact with the ground under the wheel, and the vehicle can continue to drive on the deflated tire for a longer distance.

Like the wheel halves 20 and 30, the sleeve 120 may be made in one piece from a material such as aluminum and may be forged in accordance with known manufacturing procedures. These manufacturing procedures may be substantially similar to those described above with respect to the three main components of the previously described embodiment of the invention. Because many of the components of this embodiment of the invention are substantially similar to those described above, only the differences of this embodiment will be described. Unless otherwise noted, the parts will be generally equivalent in configuration.

As shown in FIG. 11, the sleeve 120 has a tapered shape, tapering to a more narrow opening toward the outer wheel half 30. The sleeve 120 has a first end 120b that curves inwardly to form a shoulder 122, and a second opposite end 120c that curves outwardly to form a rim or stop 123. The inner tire bead 41b is locked between the stop 123 and the rim 23, and the stop 123 prevents the tire bead from moving along the inner wheel half 20 toward the outer half of the wheel when the tire becomes deflated (such as the deflated tire shown in FIG. 3). The shoulder 122 abuts the centering element 50' and provides a positive engagement between the sleeve 120 and the centering element 50'. In one embodiment, the sleeve 120 is sized to provide some space 62 between the shoulder 122 and the inner wheel half 20, so that the sleeve is free to move slightly during assembly as the wheel 100 is tightened. This space prevents the wheel from becoming over-constrained as it is tightened, as the sleeve 120 can slide within this space to adjust as necessary.

The centering element 50' is also shown in FIG. 11. In this embodiment, the centering element 50' is shaped differently from the centering element 50 in FIGS. 1-3. In particular, the rim 58 is shortened to provide room for the sleeve 120. The wheel well 60 is covered by both the centering element 50' and the sleeve 120. As before, the centering element 50' includes an outer bead lock 51 comprising a projection or stop 51a. The outer tire bead 41a is locked between the stop 51a of the centering element 50' and the rim 37 of the outer wheel half 30. The centering element 50' is clamped between the outer half 30 and inner half 20 by bolts 65. One or more O-rings 101a, 101b may be provided in corresponding grooves or slots formed in the outer half 30, inner half 20, or centering element 50', as shown in FIG. 11. Other features are also shown in FIG. 11 and will not be described specifically for this embodiment, such as the bolts 65 passing through aligning bolt holes 39, 55, and 27, and air intake holes 73.

A method by which a tire can be mounted on the wheel assembly 100 will now be described. First, the sleeve 120 is inserted into the interior of the tire 40 such that the inner bead lock 121 rests against the interior side of the inner tire bead 41b. Next, the inner wheel half 20 is inserted into the tire 40 and into the sleeve 120, such that the inner wheel half 20 engages the sleeve 120. The inner wheel half 20 is inserted into the tire 40 and into the sleeve 120 until the rim section 23 of the inner wheel half 20 rests against the exterior side of the inner tire bead 41b. At this point the inner tire bead 41b is locked between the rim 23 and the stop 123.

Next, the tire is flipped over with its exterior side facing up. The centering element 50' is inserted into the interior of the tire 40 from the exterior side of the tire 40 and aligned with the inner wheel half 20. When the centering element 50' is properly inserted, the outer bead lock 51 rests against the interior side of the outer tire bead 41a. The inner side of the centering element 50' rests on the sleeve 120, abutting the shoulder 122. An o-ring is then inserted into the o-ring track, to provide a seal between the centering element 50 and the outer wheel half. Next, the outer wheel half 30 is aligned with the centering element 50' such that the rim section 37 of the outer wheel half 30 rests against the exterior side of the outer tire bead 41a. At this point the outer tire bead 41a is locked between the rim 37 and the stop 51a.

Finally, bolts 65 are inserted through bolt holes 39 of the outer wheel half to engage with the threaded bolt holes 27 of the inner wheel half. The bolts pass through holes 55 in the centering element 50'. The bolts are tightened by a predetermined amount in order to clamp the components 20, 30, 50 together and to provide a substantially airtight seal between the tire 40 and the wheel assembly 100.

The method may also be used without the step of first inserting the sleeve 120, in order to assemble the wheel assembly according to the embodiment of the invention wherein only one of the tire beads is locked. That is, the sleeve 120 is optional, and a wheel can be assembled having the outer bead lock 51 but no inner bead lock. In such embodiments, centering element 50 may be substituted for centering element 50', and the sleeve 120 may be omitted.

In some embodiments, the inner wheel half 20 and outer wheel half 30 include elements to aid in the alignment of the centering element 50 or 50', such as posts and corresponding holes. Additionally, while threaded holes and bolts 65 are described, the components can be reversed, such as by having threaded posts extending from the inner wheel half 20 secured by threaded nuts.

Locking both the inner and outer tire beads provides an additional advantage over the prior art because it further prevents movement of the deflated tire as the automobile is driven and enables the driver to continue driving still longer distances with the deflated tire.

Military Tactical Run-Flat Wheel

Figure 4:
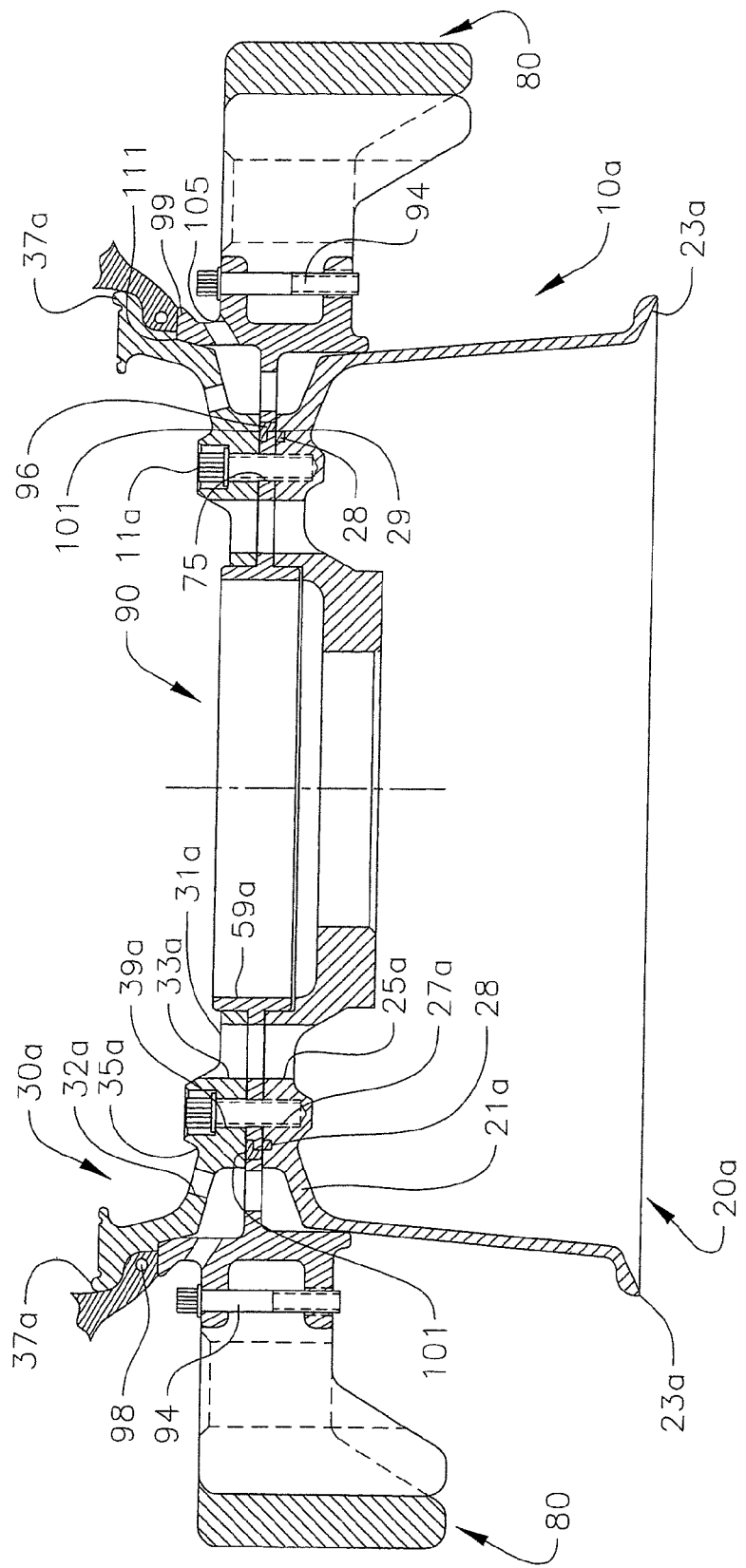
FIG. 4 is a cross-sectional view of an assembled wheel for a military vehicle with interior tire sections in accordance with an embodiment of the present invention.

Another embodiment of the invention provides a wheel for use with military vehicles. FIG. 4 shows a cross-sectional view of an assembled wheel 10a for use with a military vehicle. Similar parts will bear the same number as those used for the wheel for the light weight trucks and S.U.V.'s of FIGS. 1-3, but will be identified with the letter "a" to distinguish these parts for use with military vehicle. Unless otherwise noted, the parts will be generally equivalent in configuration.

An outer wheel half 30a and inner wheel half 20a are centered by a centering element 90 for the military vehicle. A series of bolts 11a clamp the inner wheel half 20a, centering element 90, and outer wheel half 30a. The bolts 11a pass through bolt holes 27a in a center portion 21a of the inner wheel half 20a, through holes 75 in the centering element 90, and through bolt holes 39a in an intermediate portion 35a of the outer wheel half 30a. Lightening holes 25a and 33a are provided in the inner half 20a and outer half 30a, respectively, to lighten the weight of the wheel. The lightening holes 25a are positioned in a center portion 21a of the inner wheel half 20a. On the inner wheel half 20a, an integral rim section 23a defines the lip portion of the outer circumference. A peripheral edge of the outer wheel half 30a is defined as an integral rim section 37a. An air sensor slot 32a is provided on the outer wheel half 30a.

Figure 6:
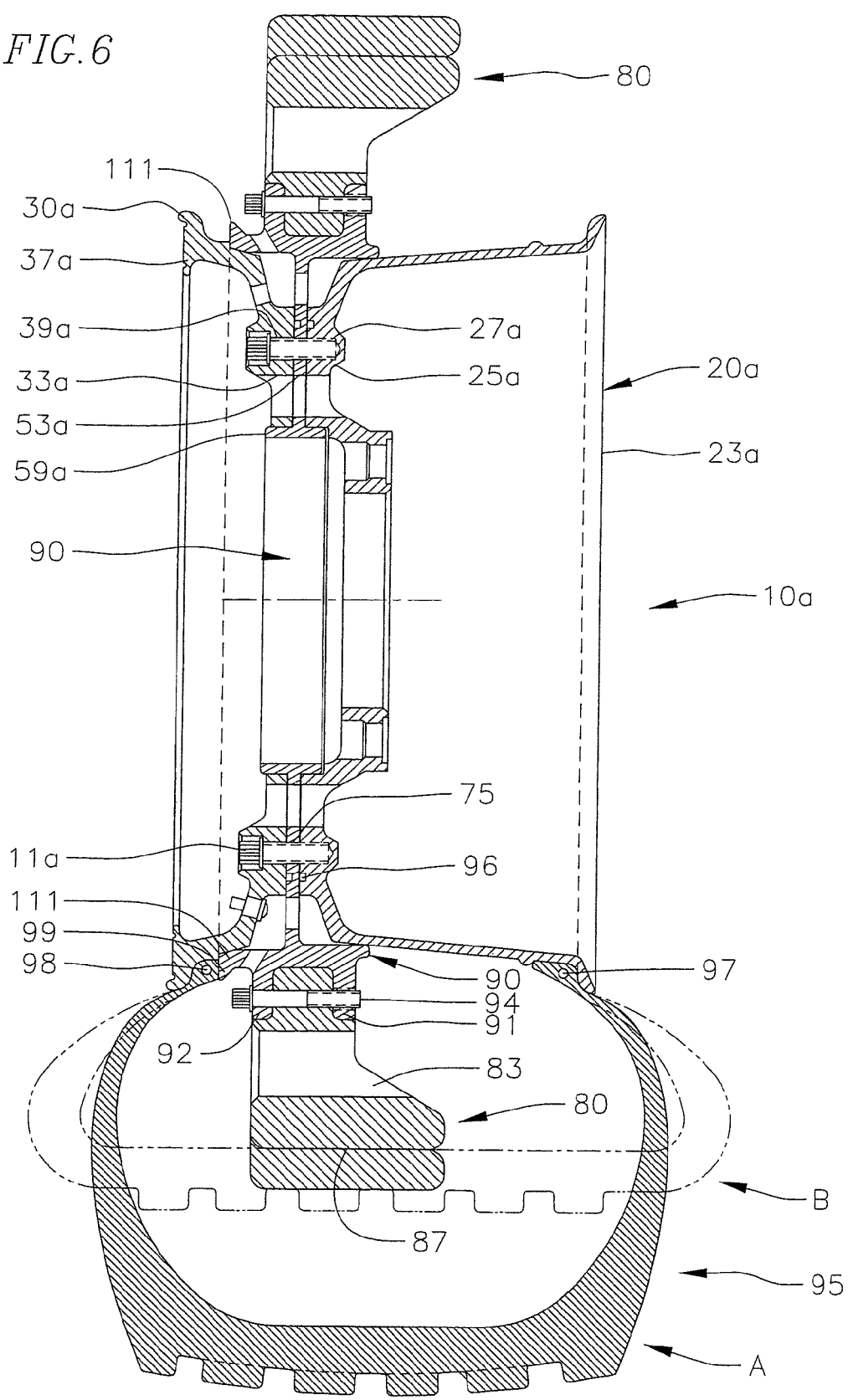
FIG. 6 is a cross-sectional view of the wheel of FIG. 4 including the interior tire sections and a partial cross-sectional view of a tire in two states of inflation.

A cross-sectional figure of the military vehicle centering element 90 is provided in FIG. 5a which shows it independently of the wheel halves 20a and 30a. The centering element 90 is shown next to a military tactical run flat interior tire 80 (FIG. 5b). The outer circumference of the centering element 90 has two prominent flanges, a first flange 91 and a second flange 92, which protrude radially away from the center of the centering element 90. On the side of the second flange 92, a series of air passages 105 are provided, similar to the air intake holes 73 in the embodiment of FIGS. 1-3 for light weight applications. An outer bead lock 99 is provided near the second flange 92. As shown in FIGS. 4 and 6, the outer bead lock 99 on the centering element 90 clamps the outer tire bead of the tire 95 between the bead lock 99 and the rim 37a of the outer wheel half 30a. This outer bead lock 99 functions similar to the outer bead lock 51 shown in FIG. 2.

Figure 8:
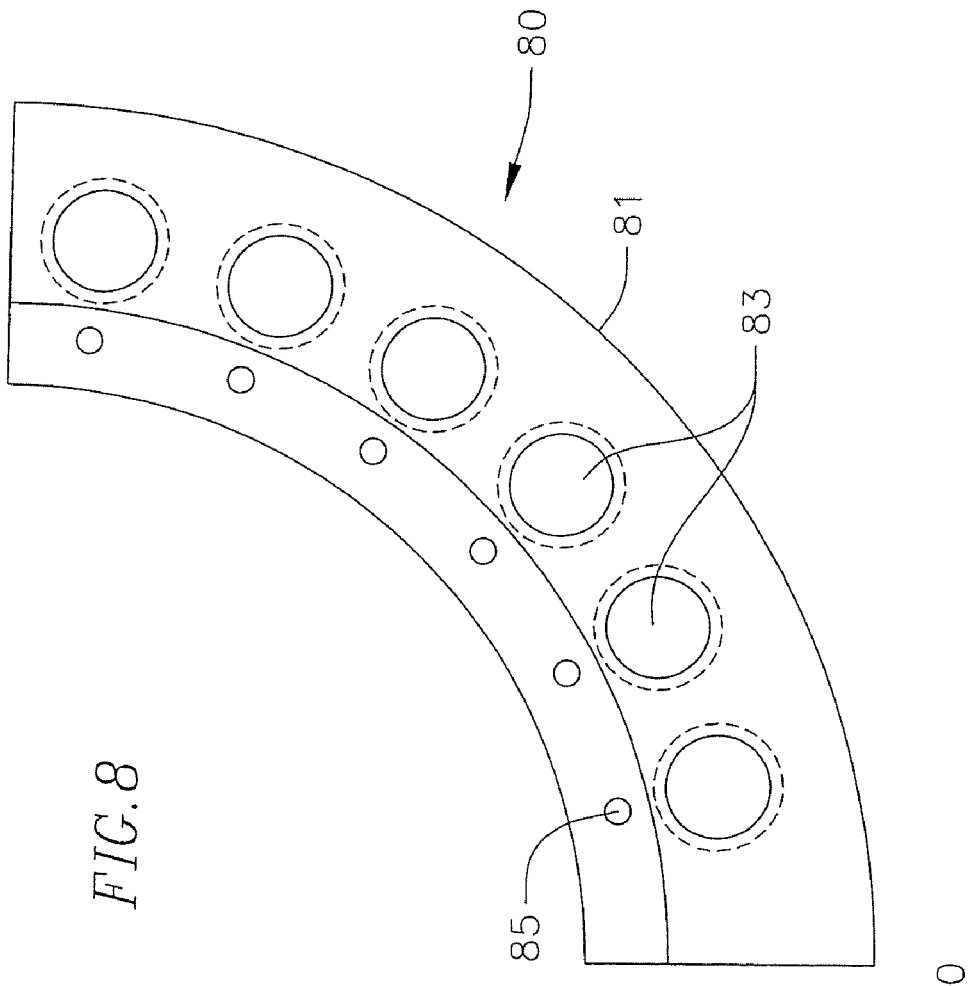
FIG. 8 is a plan view of one of the interior tire sections in accordance with an embodiment of the invention.
Figure 9:
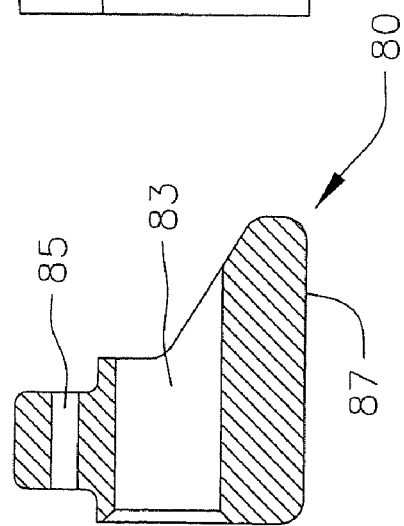
FIG. 9 is a cross-sectional view of the interior tire section of FIG. 8.

In the military tire embodiment, the wheel and tire assembly includes an interior run-flat tire 80, which is located inside the inflated military tire 95. If the tire 95 becomes deflated, the vehicle can continue to drive on the solid, interior tire 80. The interior tire 80 is mounted between the two flanges 91 and 92 of the centering element 90. In one embodiment, the interior tire 80 is made up of four sections 81 (see FIG. 8). Each interior tire section 81 is fixed to the centering element 90 with a series of attachment screws 94 (shown in FIG. 6) which fit through attachment screw holes 93 provided in the first and second flanges 91 and 92. FIG. 8 shows one of the four interior tire sections 81, with a series of small attachment screw holes 85, and another series of larger apertures 83, which are for lightening. The small attachment screw holes 85 align with the attachment screw holes 93 of the centering element 90 to accommodate the attachment screws 94. These screws 94 pass through the holes 93 in the first flange 91, through the holes 85 in the tire section 81, and through the holes 93 in the second flange 92, to secure the tire section 81 to the centering element 90. As shown in FIG. 6, the interior tire 80 sits inside the inflated tire 95. If the tire 95 becomes deflated, the vehicle continues to roll on the interior tire 80, which keeps the deflated tire 95 in contact with the ground.

The military run-flat tire 10a may also include one or more O-rings to provide a seal between the pressurized tire and the bolts 11a. FIG. 7a shows a plan view of an O-ring 101. The O-ring 101 fits into an O-ring track 96 (FIGS. 5a and 6) which is a circular groove in the centering element 90. The O-ring 101 is especially configured to have four O-ring platforms 103 placed at equal intervals from adjacent O-ring platforms 103 as shown. In FIG. 7b and FIG. 7c, the O-ring platforms' profile can be seen. The platforms 103 span between adjacent center segments 90, 290 (described further below) to seal any gaps between these segments and to keep the inflated tire airtight. The track 96 for the O-ring 101 extends all the way through the centering element 90 at each platform 103, so that the platform 103 extends between the outer half 30a and inner half 20a, contacting both, extending all the way through the center element 90. Between platforms 103 along the O-ring 101, the O-ring track 96 is a groove on the outer surface of the centering element 90 (as shown in FIGS. 4 and 5A). A second O-ring 28 may be placed in a second O-ring track 29 formed in the inner half 20a (see FIG. 4). These O-rings provide an air-tight seal between the inflated tire 95 and the bolt holes for the bolt 11a. As shown in FIG. 4, the O-ring 101 may contact the second O-ring 28 at the platforms 103, which extend through the centering element 90.

The cross-sectional view of the interior tire segment 81 and the centering element 90, along with the outer and inner wheel halves 30a and 20a, can be seen in an assembled state in FIG. 6. In the military tactical run flat tire application, a military tire 95 is used. The military tire 95 is seen in its normal inflated state A as well as in a deflated run flat state B. Inner and outer military vehicle tire beads 97 and 98 are positioned against the integral rim sections 23a and 37a of the inner and outer wheel halves 20a and 30a, respectively, in a normal inflated state of the tire. As can be seen in the figure, the outer bead lock 99 of the centering element 90 includes a projection forming a stop 111. The outer bead lock 99 firmly locks the military vehicle outer tire bead 98 against the integral rim section 37a in a small space defined between the integral rim section 37a and the bead lock stop 111. The outer bead 98 is held securely in place by the bead lock stop 111.

As described above, the military run flat wheel 10a can continue to operate with a deflated tire (state B in FIG. 6), allowing the vehicle to drive to a safe place. Additionally, the military run flat wheel 10a provides a simplified assembly process. In embodiments of the present invention, the interior tire 80 is segmented into four equal 90-degree sections 81, one of which is shown in FIG. 8 (see also FIG. 14). Variations in the shapes and cuts of the sections 81 may be made within the spirit of the present invention. The four (or more, or fewer) interior tire sections 81 are separately inserted into the interior air chamber of the surface tire 95 without specialized equipment or tools, prior to the insertion of the two modular wheel halves, 20a and 30a. Although the interior tire 80 is larger in diameter than the opening for the tire 95, the interior tire 80 can be easily inserted into the tire 95 one section 81 at a time. Thus, there is no need for specialized equipment to clamp or constrain the interior tire 80 to squeeze it into a small shape to fit into the tire 95. The separate sections 81 are inserted directly into the tire 95.

Figure 10:
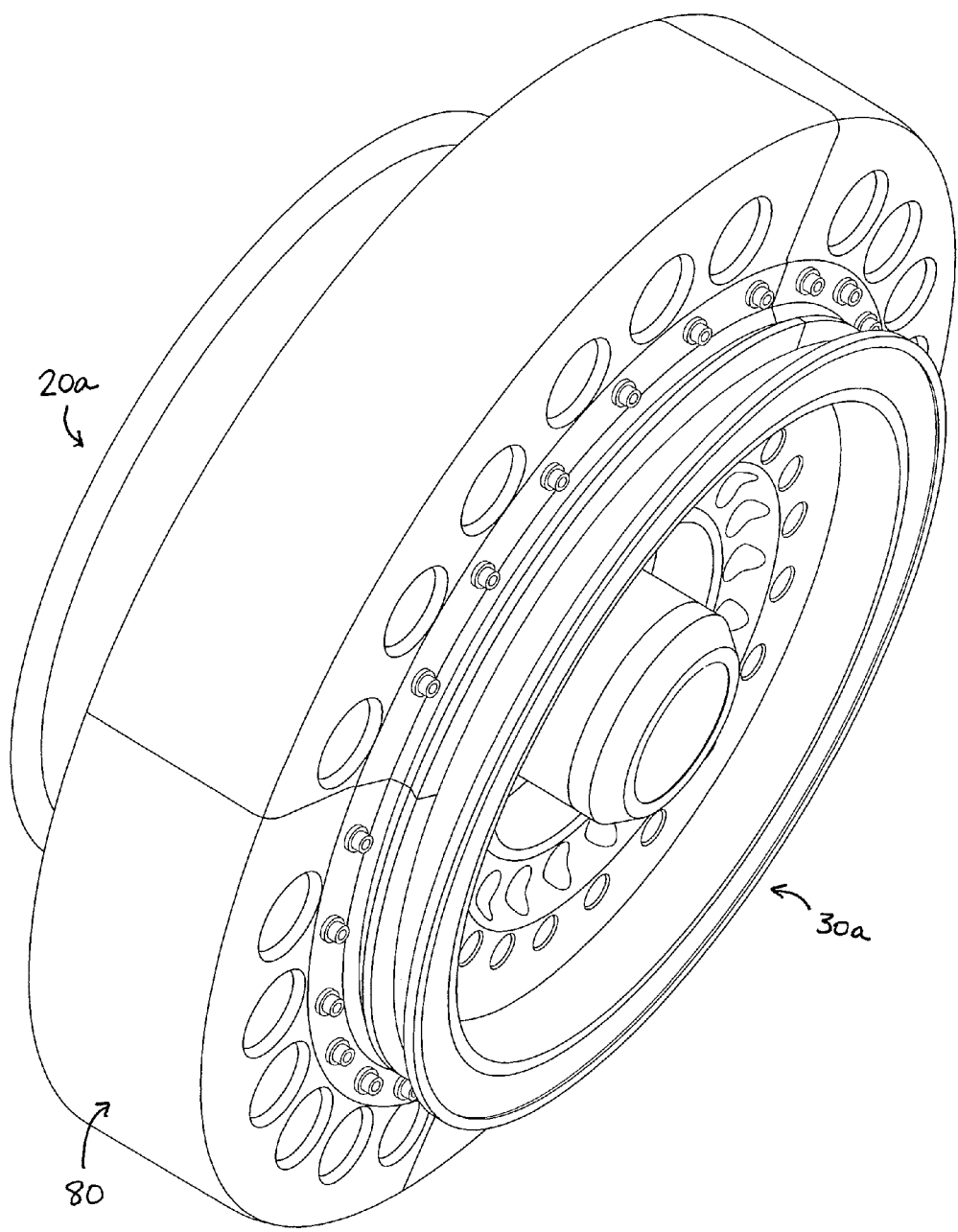
FIG. 10 is a perspective view of an assembled wheel for military use in accordance with an embodiment of the invention.

Once the tire sections 81 are inserted, the center segment 90 and the inner and outer wheel halves 20a, 30a are assembled. During the course of this assembly, the O-ring 101 is inserted into the O-ring track 96 on the centering element 90. An additional O-ring 28 is also provided in a channel 29 provided in the inner wheel half 20a. These O-rings 28 and 101 together block and seal substantially all air passage due to the four segmented interior tire sections 81 through the interior tire assembly. The modular wheel halves 20a and 30a, align concentrically with the centering element 90. When all of the above is located on the military vehicle centering element 90, thereby locking and eliminating any lateral movement, the twenty attachment screws 11a are then tightened and torqued to no more than 100 lbs each. In the end, the assembly results in a concentric rigid solid state object. FIG. 10 is a perspective view of the wheel system showing the interior tire segments 81 in place, forming an interior run flat tire 80.

One of the advantages of the wheel system 10a designed for the military vehicle use is that the time required to disassemble and re-assemble it when the tire 95 becomes deflated and disabled is approximately thirty minutes as opposed to about five hours required for an existing conventional method.

In addition, similar to the case of light weight application, the run flat wheel for the military use has the advantage of the outer tire bead 98 staying in place when the military vehicle tire 95 is deflated, unlike a conventional tire without the use of the present invention.

Figure 14:
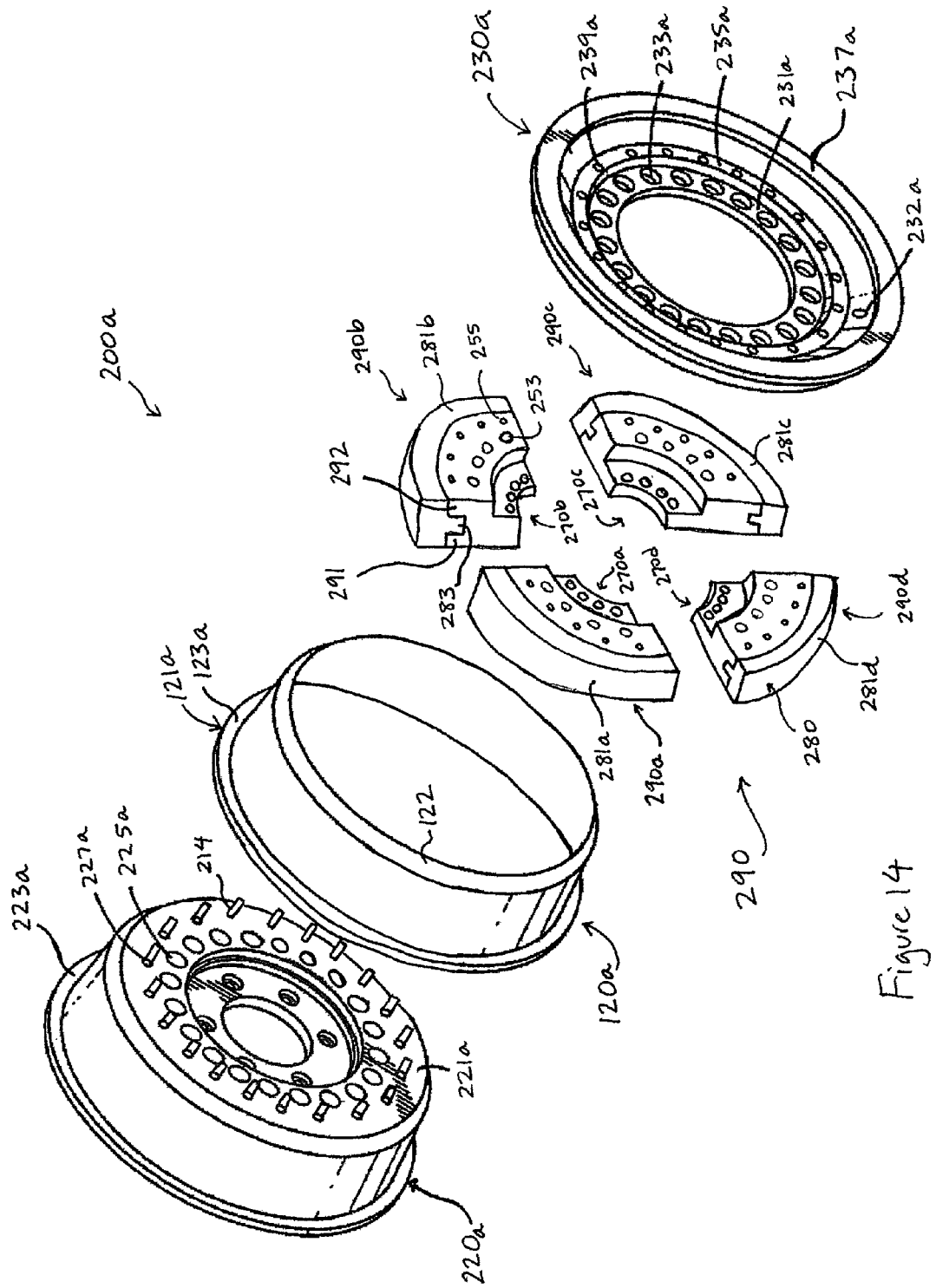
FIG. 14 is an exploded perspective view of a run-flat wheel for military use according to an embodiment of the invention.

FIGS. 12-14 depict other embodiments of a military tactical run flat wheel 100a, 200a including a sleeve 120a with an inner bead lock 121a. As shown in FIG. 12, the wheel 100a includes an inner wheel half 20a, outer wheel half 30a, sleeve 120a, and centering element 90'. The wheel 100a includes both an inner bead lock 121a and an outer bead lock 99a. Thus, like the embodiment shown in FIG. 11, the wheel 100a includes a bead lock at both the inner and outer beads 97 and 98 of the tire 95. Referring to FIG. 12, the inner bead lock 121a clamps the inner tire bead 97 of a military tire 95 between itself and the rim section 23a of inner wheel half 20a. Similarly, the outer bead lock 99a clamps the outer bead 98 of the tire 95 between itself and the rim section 37a of outer wheel half 30a. Therefore, in this embodiment, both the inner and outer tire beads are locked by the wheel 100a. If the tire becomes deflated, the two bead locks 99a and 121a prevent the deflated tire from moving along the wheel or from becoming twisted. As a result, the deflated tire remains in steady contact with the ground under the interior tire 80, and the vehicle can continue to drive on the deflated tire for a longer distance. The sleeve 120a is optional, as indicated at the bottom half of FIG. 12 (where no sleeve is shown).

The centering element 90' is also shown in FIG. 12. In this embodiment, the centering element 90' is shaped differently from the centering element 90 in FIGS. 4-6. In particular, the rim 89a is shortened to provide room for the sleeve 120a. The wheel well 60a is covered both by the rim 89a and the sleeve 120a. As before, the centering element 90' includes an outer bead lock 99a comprising a projection or stop 111. The outer tire bead 98 is locked between the stop 111 of the centering element 90' and the rim 37a of the outer wheel half 30a.

A front view of the wheel 100a is shown in FIG. 13, identifying the bolt holes 39a, lightening holes 33a, and rim 37a, with the tire 95 and interior tire 80 omitted.

Referring to FIG. 14, in one embodiment, a wheel 200a for a military tire includes a centering element 290 that is broken up into four segments 290a, 290b, 290c, 290d. Each of these pieces spans 90 degrees of the centering element 290. When the centering element 290 is used for a military run flat tire, it may include a solid rubber interior tire 280 inside the inflatable tire 95. The interior tire 280 can support the vehicle and allow the vehicle to continue to roll on a deflated tire 95. In one embodiment, the interior tire 280 is split into four sections 281a, 281b, 281c, and 281d, each of which is attached to a corresponding centering element piece 290a, 290b, 290c, 290d. By dividing the center element 290 and the interior tire 280 into four segments, these pieces can be more easily assembled inside an inflatable tire 95, so that the run-flat tire can be assembled more quickly and easily. In other embodiments, the centering element 290 and interior tire 280 may be divided along different lines or into more or fewer pieces while still remaining within the spirit of the invention.

As shown in FIG. 14, the center segments 290a-d each include a first inner flange 291 and second outer flange 292 forming a depression or U-shaped channel between them. Each inner tire section 281a-d includes a matching projection 283 that fits between the flanges 291, 292 to mount the tire 280 to the center segment 290. Note, the outer bead lock 99 is not shown in FIG. 14 for clarity.

A method by which a tire can be mounted on the military tactical run-flat wheel assembly 200a will now be described. First, the sleeve 120a is inserted into the interior of military tire 95 such that the inner bead lock 121a rests against the interior side of inner tire bead 97. Next, the inner wheel half 220a is inserted into the tire 95 and into the sleeve 120a, such that the inner wheel half engages the sleeve 120a. The inner wheel half 220a is inserted into the sleeve 120 until the rim section 223a of the inner wheel half 220a rests against the exterior side of the inner tire bead 97. At this point, the inner tire bead 97 is locked between the rim 223a and the stop 123a.

Next, the tire is flipped over with its outer side facing up. The centering element 290 is then inserted through the outer side of the tire 95 one section 290a-d at a time. Each section 290a-d is inserted into the tire 95 and aligned with the inner wheel half 220a such that the section 290a-d is resting on the inner wheel half 220. The inner side of the centering element 290 rests on the sleeve 120a and inner half 220a. The outer bead lock 99 of the centering element rests against the interior side of the outer tire bead 98.

Next, an O-ring such as O-ring 101 (shown in FIGS. 4-7, not shown in FIG. 14 for clarity)) is inserted in an O-ring track on the centering segment 290 (and, optionally, an O-ring can also be inserted into a track on the inner surface of the outer wheel half 230a). Then, the outer wheel half 230a is placed on top of the centering element 290 and aligned with each of the segments 290a-d. The rim 237a rests on the exterior side of the outer tire bead 98. This locks the outer bead 98 between the bead lock 99a (see FIG. 12) and the rim 237a.

Next, bolts 11a are inserted through bolt holes of the outer wheel half 230a to engage with threaded bolt holes of the inner wheel half 220a. The bolts 11a also pass through holes (such as holes 75, 255) in the centering element 90, 290. The bolts 11a are tightened by a predetermined amount in order to provide a substantially airtight seal between the tire 95 and the wheel assembly 100a, 200a. Alternatively, as shown in FIG. 14, the inner wheel half 220a may include threaded posts 214 that pass through holes 255 and 239a and that are secured by threaded nuts.

In embodiments where the centering element 90', 290 includes several pieces, as shown in FIG. 14, the centering element pieces 290a-d may be attached to their corresponding interior tire sections 281a-d prior to insertion into the tire. These pieces (the centering element pieces 290a-d attached to their corresponding interior tire sections 281a-d) form interior tire units 270a-d. Each interior tire unit 270 can be inserted one at a time into the tire 95 and attached to the inner wheel half 220a. The O-ring 101 is inserted into the track 96 in the centering element pieces 290a-d, with the O-ring platforms 103 spanning the intersection of each unit 270a-d. The O-ring thus provides a substantially airtight seal between each of the interior tire units 270a-d. While four interior tire units 270a-d are shown, more or fewer than four can be provided in other embodiments.

The method may also be used without the step of first inserting the sleeve 120a. In this case the wheel assembly operates with only the outer tire bead locked (via bead lock 99 on the center element 90, 290). That is, the sleeve 120a is optional, and a wheel can be assembled having the outer bead lock 99 but no inner bead lock.

In some embodiments, the inner wheel half 20a, 220a and outer wheel half 30a, 230a include elements to aid in the alignment of the interior tire units 270a-d such as posts and corresponding holes (for example, threaded posts 214 extending from inner wheel half 290a, and corresponding holes 255, 239a, as shown in FIG. 14).

Locking both the inner and outer tire beads provides an additional advantage over the prior art because it further prevents twisting of the tire as the automobile is driven with deflated tires and enables the driver to continue driving still longer distances. The segmented interior tire units also simplify assembly and replacement of the run-flat tire.

Various changes and modifications of the present invention may be made in carrying out the present invention without departing from the spirit and scope other of. Insofar as these changes and modifications are within the purview of the appended claims, they are to be considered part of the present invention.

What is claimed is:

1. A wheel system having an inner wheel half and an outer wheel half, for use with a tire, comprising:
    a centering element located between the inner wheel half and the outer wheel half, the centering element having a first bead lock configured to lock a first bead of the tire; and
    a sleeve located between the inner wheel half and the outer wheel half, the sleeve having a second bead lock configured to lock a second bead of the tire,
    wherein the inner wheel half is inserted into the sleeve, and the sleeve comprises a shoulder that abuts the centering element.

2. The wheel system of claim 1, wherein the first bead is the outer bead of the tire and the second bead is the inner bead of the tire.

3. The wheel system of claim 2, wherein the outer bead of the tire is secured between the first bead lock and a rim of the outer wheel half.

4. The wheel system of claim 3, wherein the inner bead of the tire is secured between the second bead lock and a rim of the sleeve.

5. The wheel system of claim 1, the wheel system further comprising an o-ring adapted to seal a space between the inner wheel half and the outer wheel half.

6. The wheel system of claim 1, further comprising an interior tire and wherein the interior tire is divided into a plurality of interior tire sections.

7. The wheel system of claim 6, wherein the interior tire is mounted on the centering element.

8. The wheel system of claim 6, wherein the centering element is divided into four interior tire units, each interior tire unit comprising a section of the centering element and one of the plurality of interior tire sections.

9. A wheel assembly for a tire comprising:
    an inner wheel section having a rim;
    an outer wheel section having a rim;
    a centering element positioned between the inner wheel section and the outer wheel section;
    an inner bead lock for locking the tire between the inner bead lock and the rim of the inner wheel section; and
    an outer bead lock for locking the tire between the outer bead lock and the rim of the outer wheel section
    wherein the inner bead lock comprises a stop formed on a sleeve that engages the inner wheel section, and wherein the inner wheel section is inserted into the sleeve, and the sleeve comprises a shoulder that abuts the centering element.

10. The wheel assembly of claim 9, wherein the outer bead lock comprises a stop formed on the centering element.

11. The wheel assembly of claim 9, wherein the centering element comprises four sections.

12. The wheel assembly of claim 9, further comprising an interior tire mounted on the centering element.

13. The wheel assembly of claim 9, further comprising a wheel well between the inner wheel section and the outer wheel section, and wherein the centering element covers at least a portion of the wheel well.

14. A run-flat wheel assembly for a tire, comprising:
an inner rim;
an outer rim;
a center segment clamped between the inner rim and the outer rim;
an inner stop for clamping an inner bead of such tire between the inner stop and the inner rim;
an outer stop for clamping an outer bead of such tire between the outer stop and the outer rim; and
a sleeve mounted to the inner rim, and wherein the inner stop is formed on the sleeve,
wherein the inner rim is formed on an inner wheel section, the inner wheel section being inserted into the sleeve, and the sleeve comprises a shoulder that abuts the center segment.

15. The wheel assembly of claim 14, wherein the outer stop is formed on the center segment.

16. The wheel assembly of claim 14, wherein the center segment is divided into a plurality of pieces.

17. The wheel assembly of claim 14, further comprising an inner tire mounted to the center segment.

* * * * *